(12) United States Patent
Lyakhovitskiy (10) Patent No.: US 8,442,235 B2
(45) Date of Patent: May 14, 2013

(54) EXTENSIBLE MANAGEMENT OF SELF-ENCRYPTING STORAGE DEVICES

(75) Inventor: Grigory Borisovich Lyakhovitskiy, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 12/760,181

(22) Filed: Apr. 14, 2010

(65) Prior Publication Data

US 2011/0258456 A1     Oct. 20, 2011

(51) Int. Cl.
*H04L 29/06* (2006.01)
*H04L 9/00* (2006.01)
*G06F 11/00* (2006.01)
*G06F 12/14* (2006.01)

(52) U.S. Cl.
USPC .............................. 380/277; 380/44; 713/193

(58) Field of Classification Search ........................ None
See application file for complete search history.

(56) References Cited

U.S. PATENT DOCUMENTS

| | | | |
|---|---|---|---|
| 7,631,195 B1 | 12/2009 | Yu et al. | |
| 8,230,235 B2 * | 7/2012 | Goodman et al. | 713/193 |
| 2006/0136690 A1 | 6/2006 | Hsieh | |
| 2007/0180210 A1 | 8/2007 | Thibadeau | |
| 2008/0065905 A1 | 3/2008 | Salessi | |
| 2008/0101605 A1 | 5/2008 | Kitamura et al. | |
| 2008/0147892 A1 * | 6/2008 | Carlson et al. | 710/5 |
| 2008/0273697 A1 * | 11/2008 | Greco et al. | 380/44 |
| 2009/0202080 A1 | 8/2009 | Mizuno | |

OTHER PUBLICATIONS

Zugenmaier, et al., "Transparent Encryption for External Storage Media with Key Management Adapted to Mobile Use", Retrieved at << http://www.acsac.org/2009/openconf/modules/request.php?module=oc_program&action=view.php&id=148 >>, Proceedings of the 2009 Annual Computer Security Applications Conference 2009, Dec. 7-11, 2009, pp. 7.
Hirano, et al., "Design and Implementation of a Portable ID Management Framework for a Secure Virtual Machine Monitor", Retrieved at << http://www.mirlabs.org/jias/hirano.pdf >>, Journal of Information Assurance and Security, vol. 2, Issue 3, Sep. 2007, pp. 211-216.
"Hibernation File", Retrieved at << http://www.truecrypt.org/docs/?s=hibernation-file >>, Retrieved Date: Feb. 26, 2010, pp. 1-2.
"Program Menu", Retrieved at << http://www.truecrypt.org/docs/?s=program-menu >>, Retrieved Date: Feb. 26, 2010, pp. 1-5.
"Cryptic Disk Encryption Process", Retrieved at << http://www.exlade.com/disk-encryption >>,—Retrieved Date: Feb. 26, 2010, pp. 1-2.

* cited by examiner

*Primary Examiner* — Shin-Hon Chen (57) ABSTRACT

Security device objects can be utilized to support a stack of components of computer-executable instructions that are directed to managing the security functionality represented by the security device object. In the case of hardware encrypting storage devices, a security device object can represent the self-encrypting capabilities of those devices and the attendant stack can comprise drivers directed to band and key management. A default band management driver can support a band-centric set of input/output controls that can be redirected to the band management driver. It can cache band authentication keys or provide callback mechanisms for key providers to register themselves to provide keys on-demand. Key provider identifiers can be stored on the storage device and utilized to dynamically load, install or upgrade key providers when the band authentication key is required. The band management driver can also prevent the powering-down of the storage device in an unlocked state.

20 Claims, 4 Drawing Sheets

EXTENSIBLE MANAGEMENT OF SELF-ENCRYPTING STORAGE DEVICES

BACKGROUND

Traditionally, computer readable data is typically stored by data storage hardware devices, such as hard disk drives, that comprise computer readable media on which the computer readable data is stored. To prevent unauthorized access of data, especially in situations where physical access to the data storage hardware is gained, such as through theft or loss, the concept of "full volume encryption" was developed whereby data belonging to a data volume was stored in an encrypted manner. Consequently, even if such a data storage device were to be stolen and communicationally coupled to a computing device having no executable instructions for the protection of the data, the data could, nevertheless, remain protected, since it would be physically stored in an encrypted manner.

To increase the efficiency of such full volume encryption, the task of encrypting and decrypting data can be performed by hardware associated with the storage device itself, instead of by the central processing unit of the host computing device. Such hardware encrypting storage devices appear, to higher level components, such as the operating system or application software, as traditional storage devices. However, upon receiving data for storage, such hardware encrypting storage devices automatically encrypt the data before placing it on the storage medium. Similarly, when reading data, a hardware encrypting storage device will read the data from the storage medium and decrypt it first, before providing it to higher level components.

Typically, hardware encrypting storage devices utilize one cryptographic key to encrypt and decrypt data that is stored in one range of storage locations, or "addresses", and another, different, cryptographic key to encrypt and decrypt data that is stored in a different range of storage addresses. The range of addresses which comprise data encrypted by a single key is traditionally called a "band", and the bands of a hardware encrypted storage device are typically configured by the computing device to which such a hardware encrypting storage device is communicationally coupled. Similarly, the cryptographic keys utilized to encrypt and decrypt data that is stored within the bands are typically protected, either directly or indirectly, by cryptographic keys that are likewise managed by the computing device to which such a hardware encrypting storage device is communicationally coupled. However, the computer-executable instructions, executing on such a computing device, that can perform some aspect of band management may be different from, and operate independently of, the computer executable instructions, again executing on such a computing device, that performs some aspect of key management.

SUMMARY

In one embodiment, the security aspects and functionality of a hardware encrypting storage device can be exposed via a dedicated collection of vertically integrated computer-executable instructions and special input/output control calls can be defined to allow volume management computer-executable instructions to manage aspects of the hardware encrypting storage device. Such special input/output control calls can be redirected from an existing collection of vertically integrated computer-executable instructions to the dedicated collection of vertically integrated computer-executable instructions.

In another embodiment, management computer-executable instructions that can manage aspects of the hardware encrypting storage device can receive cryptographic keys either through callback mechanisms provided by key management computer-executable instructions, or from a cache that can be populated when a cryptographic key is utilized in connection with the hardware encrypting storage device.

In a further embodiment, a particularized interface can be established to enable independent computer-executable instructions to manage aspects of hardware encrypting storage devices in a unified manner.

In a still further embodiment, computer-executable instructions directed to cryptographic key management can be dynamically loaded and, if appropriate, installed or upgraded, based on identification information provided by the hardware encrypting storage device. The computer-readable data stored on the hardware encrypting storage device can comprise such identification information, which can be associated with specific collections of data, or specific ranges of storage locations.

In a yet further embodiment, authentication and de-authentication methodology can be implemented on transitions of the hardware encrypting storage device between power states by intercepting power-centric requests directed to the hardware encrypting storage device and performing relevant operations to prevent the hardware encrypting storage device from being powered down in an unprotected state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of mechanisms that provide for a centralized and extensible framework for managing aspects of hardware encrypting storage devices. An existing collection of vertically integrated computer-executable instructions directed to the storage of computer-readable data can be extended via a dedicated collection of vertically integrated computer-executable instructions that can intercept and redirect appropriate input/output control calls and can provide a particularized interface to enable independent computer-executable instructions to manage aspects of hardware encrypting storage devices in a unified manner. The cryptographic keys required can be cached when they are first utilized or can be acquired through callback mechanisms to which key management computer-executable instructions can register. Additionally, key management computer executable instructions can be loaded, installed, or upgraded dynamically based on identifying information that can be received from the hardware encrypting storage device. Power-centric requests can be intercepted and appropriate authentication or de-authentication methodology can be implemented to avoid leaving the hardware encrypting storage device in an unprotected state when it is powered down.

The techniques described herein focus on, but are not limited to, a "stack" architecture in which vertically integrated computer-executable instructions perform actions in such a manner that computer-executable instructions representing higher portions of the stack architecture pass information and requests along to computer-executable instructions representing lower portions of the stack architecture and, conversely, computer-executable instructions representing lower portions of the stack architecture pass requested information back up to computer-executable instructions representing higher portions of the stack architecture. Indeed, the below described mechanisms can be implemented by any one or more collections of computer-executable instructions, whether part of an operating system, or executing as stand-alone computer-executable instructions. Consequently, while the descriptions below make reference to the stack architecture common in some operating systems, the scope of the descriptions themselves is not intended to be so limited and is, instead, equally applicable to any computer-executable instructions, however partitioned, including whether as part of an operating system or executing independently.

Additionally, although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 1:
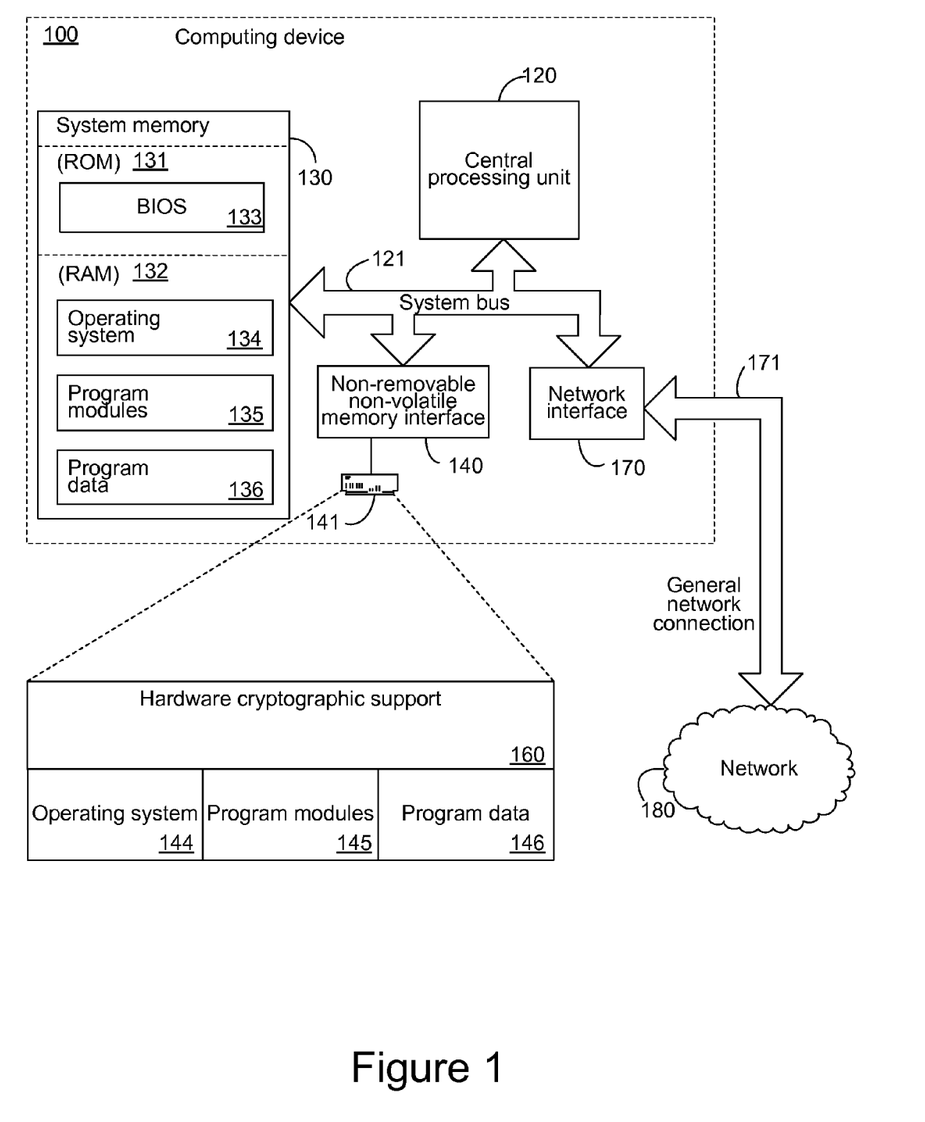
FIG. 1 is a block diagram of an exemplary computing device with a hardware encrypting storage device.

Turning to FIG. 1, an exemplary computing device 100 is illustrated that can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the other components illustrated can be physically co-located, such as on a single chip. In such a case, some or all of the system bus 121 can be nothing more than silicon pathways within a single chip structure and its illustration in FIG. 1 can be nothing more than notational convenience for the purpose of illustration.

In addition to the elements described above, the computing device 100 also typically includes computer readable media, which can include any available media that can be accessed by computing device 100 and includes both volatile and non-volatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. For example, FIG. 1 illustrates a hard disk drive 141 that reads from or writes to non-removable (from the hard disk drive itself), non-volatile magnetic media and provides hardware cryptographic support 160, such that the hard disk drive 141 itself can, for example, encrypt data provided to it by other components of the computing device 100, such as the CPU 120, without burdening the CPU 120 with such encryption. Other removable/non-removable, volatile/nonvolatile computer storage media that can be used with the exemplary computing device include, but are not limited to, magnetic tape cassettes, flash memory cards, solid state storage devices (SSDs), digital versatile disks, digital video tape, solid state RAM, solid state ROM, and the like. The hard disk drive 141, or any of these other removable/non-removable, volatile/nonvolatile computer storage media, are typically connected to the system bus 121 through a non-removable memory interface such as interface 140. For ease of illustration and reference, the below descriptions are provided within the context of the illustrated hardware encrypting hard disk drive 141 illustrated in FIG. 1 and subsequently. However, as will be clear to those skilled in the art, none of the below described mechanisms are limited to the magnetic media of the hard disk drive 141 and can be equally implemented on any type of computer storage media, including any of the removable/non-removable, volatile/nonvolatile computer storage media enumerated above.

Although not specifically illustrated in FIG. 1, the hardware cryptographic support 160 of a hardware encrypting storage device, such as the hardware encrypting hard disk drive 141, can comprise a dedicated processor and/or memory for performing cryptographic functions, such as the encryption or decryption of data provided to the hard disk drive or read by the hard disk drive from its storage media. Such encryption and decryption can be performed with reference to one or more cryptographic keys often referred to as "drive media keys" that can be maintained by the hardware cryptographic support 160. The drive media keys can themselves be protected by one or more other keys, such as in a well known key layering protection scheme in which one key at one level protects another key at a lower level. Ultimately, cryptographic keys controlled and managed by processes executing on the computing device 100, such as the operating system 134 or the program modules 135, can, via such a series of layered keys, be utilized to either lock or unlock the computer readable data stored on the storage media of the hardware encrypting hard disk drive 141. More specifically, by providing the relevant keys within their control, processes executing on the computing device 100 can unlock the data stored on the hard disk drive 141 by enabling the hardware cryptographic support 160 to unprotect and utilize the drive media keys to decrypt data being read from the storage media of the hard disk drive and encrypt data being written to it. Similarly, by instructing the hardware cryptographic support 160 to protect the drive media keys, rendering them inaccessible except via the keys maintained by the processes executing on the computing device 100, those processes can lock the data stored on the hard disk drive 141 and render that data inaccessible.

The drives and their associated computer storage media discussed above and illustrated in FIG. 1, provide storage of computer readable instructions, data structures, program modules and other data for the computing device 100. For example, the hardware encrypting hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

The computing device 100 may operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
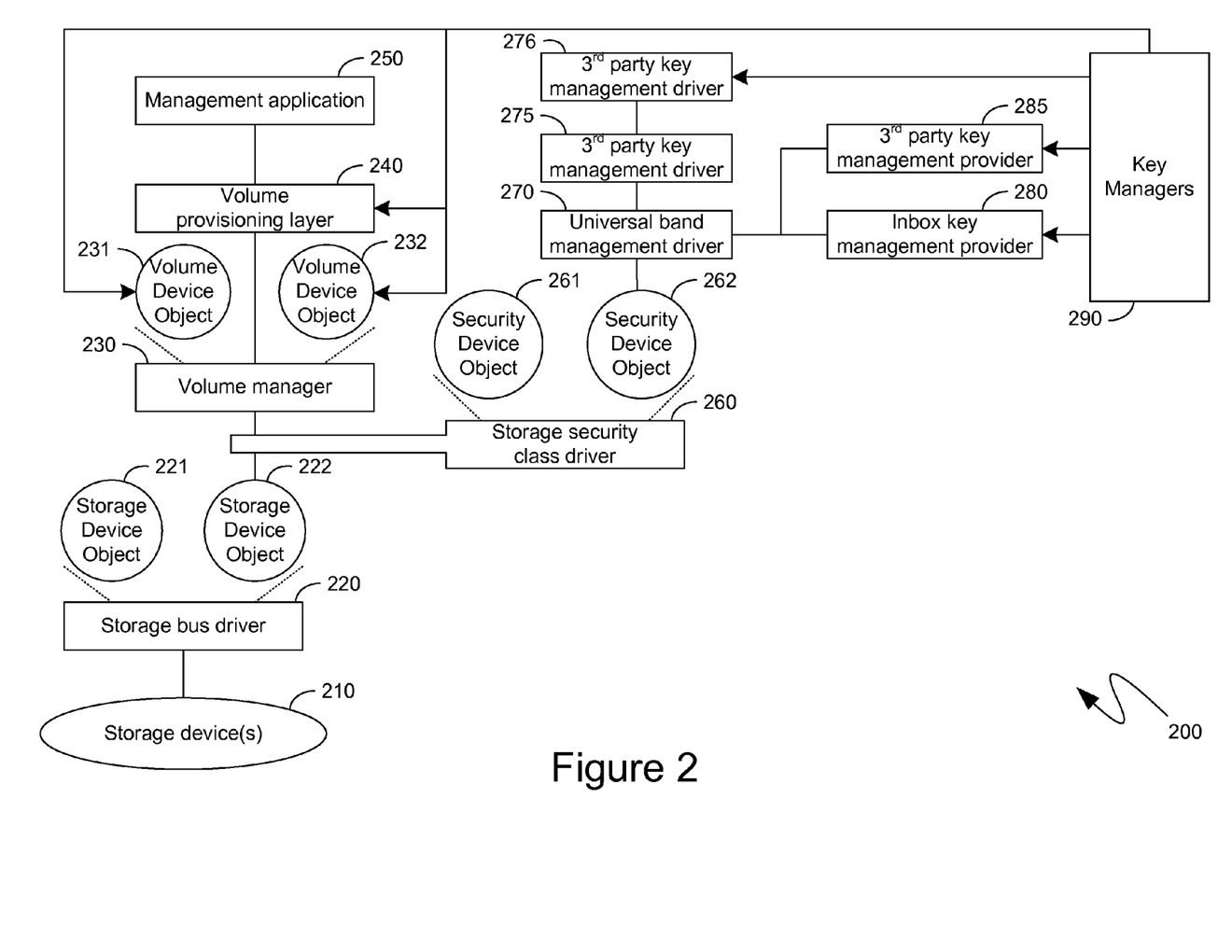
FIG. 2 is a block diagram of an exemplary collection of existing and dedicated vertically integrated computer-executable instructions.

Turning to FIG. 2, the system 200 shown therein illustrates an exemplary set of objects and collections of computer-executable instructions oriented in a commonly illustrated vertical arrangement wherein the objects and collections of computer-executable instructions visually depicted as being higher in the vertical arrangement transmit requests and information to the objects and collections of computer executable instructions that are visually depicted as being lower in the vertical arrangement and, conversely, those elements depicted as being lower in the vertical arrangement perform the requested actions and return responsive information to those elements depicted as being higher in the vertical arrangement. As will be recognized by those skilled in the art, at least some of the objects and collections of computer-executable instructions illustrated in the system 200 of FIG. 2, can be elements of an operating system, such as the operating system 134 illustrated in FIG. 1, while others of the objects and collections of computer-executable instructions illustrated in FIG. 2 can be elements of stand-alone applications or utilities, such as those generically represented by the program modules 135 illustrated in FIG. 1.

At the lowest layer of the layered elements illustrated by the system 200 of FIG. 2 can be the storage devices 210, which can include hardware encrypting storage devices, such as the hardware encrypting hard disk drive 141 illustrated in FIG. 1. Communicationally coupled to the storage devices 210, can be the computer executable instructions that comprise the storage bus driver 220. As will be recognized by those skilled in the art, the storage bus driver 220 can typically be a component of an operating system, such as the operating system 134 illustrated in FIG. 1, and can comprise functionality directed to the discovery of, and the communication with, storage devices that are communicationally coupled to the computing device 100, shown in FIG. 1, on which the computer-executable instructions that comprise the storage bus driver 220 can execute.

The storage bus driver 220 can, in one embodiment, create device objects, such as the device objects 221 and 222 illustrated in the system 200 of FIG. 2, that can act as representations of one or more of the storage devices 210 detected by the storage bus driver and with which the storage bus driver has established communications. Typically, a single device object, such as the device objects 221 or 222, will be created for a single storage device, although, as will be known by those skilled in the art, certain types of storage devices can result in the creation of multiple storage device objects for a single storage device.

A single storage device, such as can be represented by a storage device object, can be further divided into one or more logical volumes. Traditionally, the division of a storage device into logical volumes occurs in such a manner that a single volume comprises a contiguous array of storage locations on the storage device. Nevertheless, the below-described mechanisms are equally applicable with non-contiguous volumes comprising multiple extents. Computer-executable instructions representing a volume manager, such as the volume manager 230 shown in FIG. 2, can utilize the storage device objects 221 and 222 created by the storage bus driver 220 to divide one or more of the storage devices 210 into one or more volumes. In the exemplary system 200 of FIG. 2, the volume manager 230 is shown as utilizing the storage device object 222, and not the storage device object 221, to illustrate that individual storage device objects can be handled independently and one storage device can be partitioned into volumes, while another may not.

As shown in the system 200 of FIG. 2, the volume manager 230 can create one or more volume device objects, such as the volume device objects 231-232, to represent the volumes into which the storage device associated with the storage device object 222 was partitioned. Computer-executable instructions representing a volume provisioning layer 240, and one or more management applications 250, can be communicationally coupled to the volume manager 230, and can provide a user interface for the volume manager. For example, the management application 250 can be any one of a number of utility application programs that are capable of partitioning a storage device into one or more logical volumes, and provide a user interface to enable the user to access such functionality, and control its utilization. Similarly, the volume provisioning layer 240 can likewise provide a user interface to enable the user to selectively partition into volumes one or more storage devices.

The storage bus driver 220, volume manager 230, and volume provisioning layer 240 can typically be part of known operating systems, such as the operating system 134 shown in FIG. 1. While the exact implementation is, obviously, operating-system-specific, the below descriptions assume that the relevant functionality of the storage bus driver 220, volume manager 230 and volume provisioning layer 240, or one or more management applications 250, is somehow already present on the computing device 100 of FIG. 1 and, thereby, can serve as a base from which the below-described mechanisms can progress.

In one embodiment, computer-executable instructions that implement a storage security class driver can be executed on the computing device 100 of FIG. 1 to discover the security functionality of a storage device, such as a hardware encrypting storage device. More specifically, in a manner analogous to that in which the storage bus driver 220 communicates with the storage devices 210 and discovers their communicational connection to the computing device on which the storage bus driver is executing, the storage security class driver 260 can likewise communicate with the storage devices 210, such as via one or more of the storage device objects 221 and 222 created by the storage bus driver 220, and discover whether any one or more of the storage devices 210 comprises security functionality that can be exposed by the storage security class driver as a security device object. As before, the storage security class driver 260 is illustrated in the exemplary system 200 of FIG. 2 as maintaining communicational connection with the storage device object 222 and not the storage device object 221, to illustrate that the storage security class driver 260 can independently select one or more storage device objects with which to communicationally couple. Typically, the storage security class driver 260 can establish a communicational connection with those storage device objects that are associated with a storage device that comprises security functionality that can be exposed by the storage security class driver as one or more security device objects. The security device objects generated by the storage security class driver 260 can represent those security functions that the storage security class driver discovered in communicating with the storage devices 210 via the storage device objects associated with such storage devices that are exposed by the storage bus driver 220. In the exemplary system 200 of FIG. 2, a storage security class driver 260 is shown as providing two independent security device objects 261 and 262 that can represent security capabilities of the storage device associated with the storage device object 222 with which the storage security class driver is communicationally coupled. In one embodiment, discovered security functions that are represented by security device objects, such as the security device objects 261 and 262, can be represented by IEEE 1667 silos at the host-device protocol level.

In one embodiment, separate stacks of components of computer-executable instructions can be built on top of the security device objects created by the storage security class driver 260 in the same, known, manner in which stacks of components of computer executable instructions can be built on top of storage device objects. One such stack can be responsible for managing specific ranges of storage locations, or addresses, on a hardware encrypting storage device. In the exemplary system 200 shown in FIG. 2, the security device objects 262 can represent the security functionality exposed by a hardware encrypting storage device, such as the ability to encrypt data being provided to the storage device, and subsequently decrypt the data being read from the storage device, in accordance with one or more cryptographic keys that are ultimately managed by computer-executable instructions executing on the computing device to which that hardware encrypted storage device is communicationally coupled.

For ease of reference, and in conformance with the terminology commonly utilized by those skilled in the art, the term "bands" will be utilized hereinafter to refer to ranges of storage addresses on a hardware encrypting storage device that share one or more common cryptographic aspects. For example, a single band can comprise data that can all be decrypted with a single cryptographic key and, similarly, any data written to that band can be encrypted with that same key prior to being written to the storage medium. Often, the range of storage addresses that comprise a single band will be the same range of storage addresses that comprise a single volume, such that the volume, because it is co-located with the band, has, essentially, a single cryptographic key that encrypts, on the hardware encrypting storage device all data being written to that volume and, correspondingly, decrypts all data being read from that volume. In such a case, operations directed to the volume, such as resizing the volume, deleting the volume or creating a new volume can have corresponding impacts on the band that is co-located with that volume. However, to perform any action that impacts that band, therefore, it may be necessary to first render that one cryptographic key associated with that band accessible to the relevant processes.

Computer-executable instructions providing a universal band management driver, such as universal band management driver 270 shown in the exemplary system 200 of FIG. 2, can be located at the bottom of a stack, so as to enable other sets of computer-executable instructions that are part of the same stack to process input/output requests and communications prior to the universal band management driver. Consequently, as shown in FIG. 2, universal band management driver 270 can be the bottom member of a stack of separate sets of computer executable instructions built on top of a security device object, such as the security device object 262. The other members of such a stack, such as the computer executable instructions that comprise the third-party key management drivers 275 and 276, can be arranged, such as visually represented in FIG. 2, so that communications and requests can be processed by the third-party key management drivers 276 and 275, respectively, prior to being processed by the universal band management driver 270. As before, the universal band management driver 270 is shown as communicating with only the security device object 262, and not the security device object 261, to illustrate the security device objects 261 and 262 are separate and independent objects, including, for example, objects where the functionality of the universal band management driver 270 may be only applicable to, or relevant to, the security device object 262, and not the security device object 261.

In one embodiment, the computer-executable instructions implementing the universal band management driver 270 can support specific band management input/output controls that can be utilized by other processes to perform various band management actions. The computer executable-instructions implementing the universal band management driver 270 can further be capable of utilizing a band management protocol, described in greater detail below, that can be supported by the storage device, from among the storage devices 210, that has the self-encrypting capability that is exposed by the security device object 262, to enable the universal band management driver 270 to appropriately instruct such a hardware encrypting storage device.

As indicated previously, the hardware-supported encryption and decryption provided by hardware encrypted storage devices, such as the hardware encrypting hard disk drive 141 shown in FIG. 1, can be based on cryptographic keys, that can ultimately be protected by cryptographic keys that are managed by computer-executable instructions executing on a computing device to which such a hardware encrypting storage device is communicationally coupled. Such cryptographic keys can be managed by key management computer-executable instructions, such as computer executable instructions that comprise the key managers 290 shown in exemplary system 200 of FIG. 2. In one embodiment, the universal band management driver 270 need not, itself, directly provide key management functionality, but can, instead, utilize the key management functionality provided by the key managers 290, which can even be legacy key managers. Computer-executable instructions implementing an inbox key management provider 280, or a third-party key management provider 285, can interface between the key managers 290 and the universal band management driver 270.

Utilizing one or more of the key management providers 280 and 285, the universal band management driver 270 can obtain cryptographic keys, which can be utilized, either directly or indirectly, to, ultimately, lock and unlock various bands on a hardware encrypting storage device associated with the security device object 262. In one embodiment, the universal band management driver 270 can obtain such keys from a cache that can be maintained by the universal band management driver, or on its behalf. In an alternative embodiment, however, the universal band management driver 270 can obtain such keys from the one or more key management providers 280 and 285, such as via a callback mechanism that will be described in greater detail below. For example, if a key management provider, such as the default inbox key management provider 280, or a specialized third-party key management provider 285, indicates that the cryptographic key that it has provided is not to be cached, such a key can be discarded from memory by the universal band management driver 270 after a security operation for which the key was utilized completes. In such a case, the universal band management driver 270 may not be able to obtain such a key from a cache, and can, instead, utilize the callback mechanisms to request such a key should it be required at a subsequent time.

If key caching is performed by, or on behalf of, the universal band management driver 270, key managers 290 can take advantage of such caching and need not provide additional components. However, if cryptographic keys are requested to not be cached, key managers 290 can register key management providers, such as the key management providers 280 and 285, with the universal band management driver 270 such that the registered key management providers can supply cryptographic keys relevant to specific bands when requested by the universal band management driver. Alternatively, key managers 290 can add key management drivers as upper filters for the universal band management driver 270. In such an embodiment, those key management drivers, by virtue of being comprised of computer-executable instructions executing at a higher level of the stack architecture than the computer-executable instructions that comprise the universal band management driver 270, can process band management input/output controls before the universal band management driver. The third-party key management driver 276, shown in the exemplary system 200 of FIG. 2, illustrates one example of such an embodiment. If a key management driver, such as the third-party key management drivers 275 and 276, can obtain a cryptographic key associated with a band to which an action is directed, that key management driver can perform the relevant operation by interacting with the storage device itself and without necessarily requiring additional processing by the universal band management driver 270.

As indicated previously, a band management protocol can be supported by the universal band management driver 270. One exemplary protocol can comprise mechanisms for supporting the enumeration of bands already present on the storage device, the creation of new bands on the storage device, the changing of band locations on the storage device, the changing of band security parameters, the cryptographic erasure of data within a band and the deletion of one or more bands.

In the case of enumerating a band, the exemplary protocol can provide for parameters indicating a specific band, such as through a band identifier, to be enumerated or an "enumerate all bands" flag. In response, for each enumerated band, that band's start and size, metadata and locking state can be provided. In addition, information or identification of a specific key manager can be provided, along with any other relevant or present key management metadata.

To enable the creation of a band, the exemplary protocol can provide for parameters indicating the band size and starting location, information to be stored in, or that is part of, any metadata associated with the band and information regarding the locking state of the band. Additionally, exemplary protocol can provide for parameters indicating an identifier of the key manager, such as from among the key managers 290, that can be responsible for managing the cryptographic keys associated with the band, as well as information regarding the authentication cryptographic key associated with the band, and any metadata that may be relevant to, or utilized by, the identified key manager. Optionally, exemplary protocol can provide for a reference band identifier or offset parameter. This parameter can be provided when adding an extent to an existing volume. Key managers, such as the key managers 290, can configure the newly created band similarly to the reference band. At a minimum, the same key manager can set the band authentication key, while some key managers may go even further and replicate the authentication key from the reference band to the newly created band.

To facilitate the changing of a band's location on a storage device, the exemplary protocol can provide for parameters indicating an identifier of the band whose location is to be changed, or a band offset that can serve the same function, and the new starting location and new size desired for that band. Optionally, the exemplary protocol can further provide for parameters associated with the metadata of that band, as well as an indication of the current band authentication key. If the latter parameter is not provided, either the band can have a default key, or one of the key management drivers, such as the third-party key management drivers 275 or 276, or the key management providers, such as the inbox key management provider 280 or the third-party key management provider 285, should be able to supply the key in order for the call to succeed.

Similarly, to facilitate the changing of a band's security, the exemplary protocol can provide for parameters again indicating an identifier of the band whose security is to be changed, or a band offset that can serve the same function, the current band authentication key, and the new security information, such as the band locking state. Optionally, the exemplary protocol can also provide for parameters specifying a new key manager, such as via a key management identifier, new key management metadata, and a new band authentication key. If a new band authentication key is not provided, the authentication key of the band can be left unchanged.

The exemplary protocol can facilitate the cryptographic erasure of data within a band via similar parameters since, in one embodiment, the cryptographic erasure of data within a band can result in the generation of a new random cryptographic key for the band, thereby rendering the data stored on such a band useless. The band, however, can remain in its existing location. Consequently, the cryptographic erasure of data within a band can be similar to the changing of a band's security, since both can comprise the changing of a cryptographic key for the band, and the exemplary protocol can, thereby, provide for similar parameters, such as the identification of the band whose contents are to be securely erased, the current band authentication key, and the like.

Finally, as indicated, the exemplary protocol can provide for the requesting of the deletion of a band enabling the specification of the following parameters: the band identifier, or offset, and an erase flag, and a current band authentication key. If provided, the erase flag can indicate that the band is to be cryptographically erased prior to removal. Conversely, if the current band authentication key is not provided, either the band can have a default key, or one of the key management drivers or key management providers should be able to supply the key.

In one embodiment, metadata referenced above can be stored in storage space provided by hardware encrypting storage device on a per-band basis. Such allocated storage space can enable the volume provisioning layer 240 to store band-specific information, including, for example, an identifier of the corresponding volume, and can also enable the key managers 290 to store information that may be specific to them or utilizable by them, such as, for example, a unique identifier identifying the key manager, from among the key managers 290, that owns the band.

The above described exemplary protocol can be utilized by, for example, the volume provisioning layer 240, or one or more of the management applications 250, to perform various band-centric operations. Input/output controls in accordance with the above described exemplary protocol can be provided by, for example, the volume provisioning layer 240 to the volume manager 230, and subsequently from the volume manager to the storage device object 222 that is representative of the hardware encrypting storage device upon which the requested operations are to be performed. In one embodiment, such input/output control communications can be intercepted by the storage security class driver 260, and can be routed by the storage security class driver through the key management drivers and key management providers associated with the security device object, such as the security device object 262, that is associated with the security capabilities of the hardware encrypted storage device that are referenced by the input/output control communications.

Figure 3:
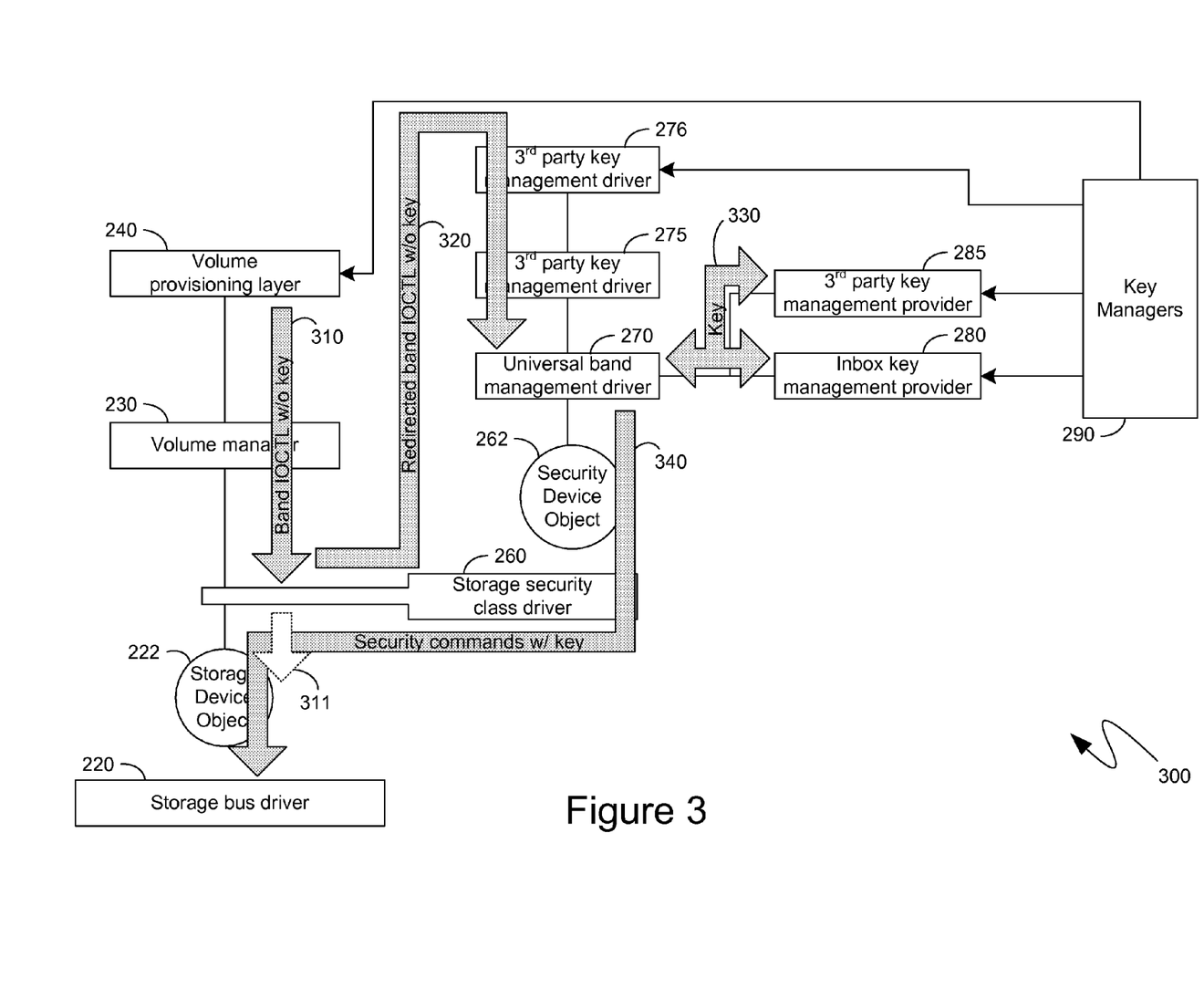
FIG. 3 is a block diagram of an exemplary communicational flow among collections vertically integrated computer-executable instructions.

Turning to FIG. 3, the exemplary system 300 shown therein illustrates an exemplary communicational path in which input/output control communications in accordance with the above described protocol can be intercepted by the storage security class driver 260 and routed in such a manner as to obtain the relevant cryptographic keys required to be provided to the hardware encrypting storage device. More specifically, as shown in FIG. 3, the volume provisioning layer 240, for example, or one or more of the management applications 250, which are not specifically shown in FIG. 3, can initiate some form of band-centric input/output control in accordance with the above described protocol. Such an initial band-centric input/output control is shown in the exemplary system 300 of FIG. 3 as the communication 310. As an example, the communication 310 can be a communication initiated by the volume provisioning layer 240, utilizing the above described protocol, to change a band's location, or its security.

However, the initial communication 310 may not comprise the relevant cryptographic key that can be required to ultimately perform the requested action. Instead, as shown in the exemplary system 300 of FIG. 3, the storage security class driver 260 can intercept the communication 310 and can redirect it, as communication 320, through the stack of separate components of computer-executable instructions that are layered on top of an appropriate security device object, such as the security device object 262, that can represent the relevant security aspects of the storage device to which the initial communication 310 was directed. Returning to the above example, if the communication 310 is a communication to, for example, change a band's location or its security, then the storage security class driver 260 can intercept the communication 310 and redirect it, as communication 320, through the stack of separate components of computer-executable instructions that are layered on top of the security device object 262 that can represent the hardware encrypting aspect of the hardware encrypting storage device represented by the storage device object 222 to which the original communication 310 would have been directed prior to its interception by the storage security class driver 260.

In one embodiment, the correct security device object, such as the security device object 262, through whose associated stack the communication 320 is to be redirected can be located via enumeration mechanisms in the storage security class driver 260. For example, enhanced storage frameworks in modern operating systems can provide mechanisms for enumeration of IEEE 1667 silos and the respective device objects.

The above-described redirection can be implemented by configuring the storage security class driver to provide an input/output control redirection mechanism that can allow computer-executable instructions from the stacks built on top of security device objects to request redirection of certain input/output controls to the stack comprising the requesting computer-executable instructions. For example, the universal band management driver 270 can register, with the storage security class driver 260, the band management input/output controls that were described above in reference to the exemplary band management protocol. When the storage security class driver 260 receives one of those registered input/output controls, it can perform the redirection illustrated by communication 320 by creating a proxy input/output request with an appropriate number of stack locations, filling it in with the parameters from the original band-centric input/output control and sending it to the top of the relevant, in this case band management, stack. Thus, as shown in the exemplary system 300 of FIG. 3, the redirected communication 320 can proceed through the third-party key management drivers 276 and 275, respectively, and then the universal band management driver 270. After the proxy input/output request has been completed, the original input/output controls can be completed with the same status and information.

As indicated previously, the original communication 310 may not comprise the relevant cryptographic keys that could be necessary to perform the input/output control requested of the storage device in the original communication 310. The redirected communication 320 through the stack of computer-executable instructions associated with the security device object 262 is designed, at least in part, to obtain such a relevant cryptographic key in order to enable the performance of the requested input/output control. In one embodiment, the specific key management provider whose computer-executable instructions manage one or more cryptographic keys that are associated with a specific band can be determined based on an identifier that is associated with the band. As indicated previously, such an identifier can be part of the metadata that can be stored on the storage device, and that can be added, modified, or deleted via the above described protocol. Individual key management providers, such as the third-party key management provider 285, can register to be the key management providers for specific bands by referencing these band identifiers. If no key management provider is registered for the specific band identifier, which can be obtained from the hardware encrypting storage device, or which can be specified in the communications 310 and 320, a default key management provider, such as the inbox key management provider 280, can be utilized.

As illustrated by the communications 330 shown in the exemplary system 300 of FIG. 3, the universal band management driver 270 can utilize the band identifier, or an identification of a specific key management provider, to establish the communications 330 with the relevant key management provider in order to obtain the cryptographic keys relevant to the input/output control of the communication 320. Once the universal band management driver 270 has obtained the relevant cryptographic keys, such as via communications 330, those relevant cryptographic keys can be utilized to enable the universal band management driver 270 to perform the actions relevant to, such as those requested by, or necessitated by, the input/output controls of the communication 320 and, accordingly generate the command communications 340 comprising those relevant actions with the relevant cryptographic keys that will enable the storage device to perform the requested functions. For example, in one embodiment, a single band-centric input/output control that can be communicated to the universal band management driver 270 via the communication 310 and subsequently redirected communication 320 can cause the universal band management driver 270 to generate a series of command communications 340, including, for example, communications instructing the hardware encrypting storage device to: start a session, authenticate the session with the relevant cryptographic key, such as that obtained via communications 330, iterate through band table rows to find the band relevant to the band-centric input/output control, start a transaction, make modifications to the tables, stop and commit the transaction, and close the session.

The command communications 340 can then be directed through the storage device object associated with the relevant storage device, such as the storage device object 222, in the same manner as the original communication 310 would have been directed had it not been redirected by the storage security class driver 260 in the manner described in detail above. The dashed arrow labeled 311 in FIG. 3 is meant to represent the intended path of the original communication 310, and to illustrate that the communications 340 continue along that same intended path.

In some situations, the bands of a hardware encrypting storage device may need to be changed during operations that are not normally initiated by one of the key managers 290. For example, a utility may attempt to change the size of a volume on the hardware encrypting storage device without being aware that the cryptographic band associated with such a volume should also be changed in the same manner. Since band authentication keys may be necessary in order to perform operations on bands, band authentication keys may need to be obtained, such as by the universal band management driver 270, in association with the communications 330 described above, before the respective commands are sent to the hardware encrypting storage device. In one embodiment, band authentication keys can be cached by, or on behalf of, the universal band management driver 270 when a band is initially unlocked. Subsequently, when an action, such as the redirected input/output control of the communication 320, that requires one or more of the band authentication keys is received by the universal band management driver 270, the universal band management driver can simply reference this cache and obtain the relevant cryptographic key. For security purposes, in one embodiment, the utilization of a cached key by the universal band management driver 270 can be limited to band operations that do not change the security state or the authentication key of the band. This policy can be enforced by the universal band management driver 270.

However, band authentication key caching may be undesirable for security reasons and, as such, the key manager, from among the key managers 290, that provides the band authentication key may indicate that the key is not to be cached. In an alternative embodiment, therefore, the universal band management driver 270 can provide a mechanism whereby one or more key management providers can register for notifications, from the universal band management driver, about band operations that have been requested without an authentication key. Registration, by the key management providers, such as the third-party key management provider 285 or the inbox key management provider 280, can be performed by making a call to the universal band management driver 270 and providing the address of a callback function that the universal band management driver 270 can call when it receives a band-centric input/output control without a band authentication key.

In one embodiment, the above referenced callback function can provide for parameters that can specify the storage device object for which such a callback is to apply, one or more band identifiers to which such a callback is to apply, and information regarding the requested operation for which the band authentication key is being requested, including the current band location and the new band location if the band is being moved, and the current band security and the new band security if the band security is being changed. The callback can either return the current band authentication key or can veto the entire operation, in which case the original band-centric input/output control request can be failed, such as by the universal band management driver 270.

When a key management provider, such as the third-party key management provider 285 or the default inbox key management provider 280, registers with the universal band management driver 270, they can provide one or more key management identifiers that can be used to associate specific bands of the hardware encrypting storage device with the key management provider providing the identifiers. In one embodiment, those key management identifiers can be used to dynamically load key management providers. For example, the key management providers, such as the third-party key management provider 285 and the inbox key management provider 280, can utilize a pre-defined configuration store, such as an operating system registry database to associate key management identifiers with a particular set of computer-executable instructions. If the universal band management driver 270 discovers an identifier for which no key management provider has registered a callback, it can scan this pre-defined configuration store for an entry pointing to the set of computer executable instructions of the relevant key management provider and can cause that set of computer-executable instructions to be instantiated.

Such a mechanism can also be utilized to dynamically download or update the computer executable instructions of one or more key management providers. In one embodiment, the key management identifiers of the bands of the hardware encrypting storage device can be retrieved from the hardware encrypting storage device, such as during device enumeration, and can be uploaded in some form to an update server. The update server can then search for software packages in its database based on the provided identifiers and, if a match is detected, the respective software package can be suggested for installation or an update if a newer version, than the version installed on the relevant computing device, is available on the server.

Figure 4:
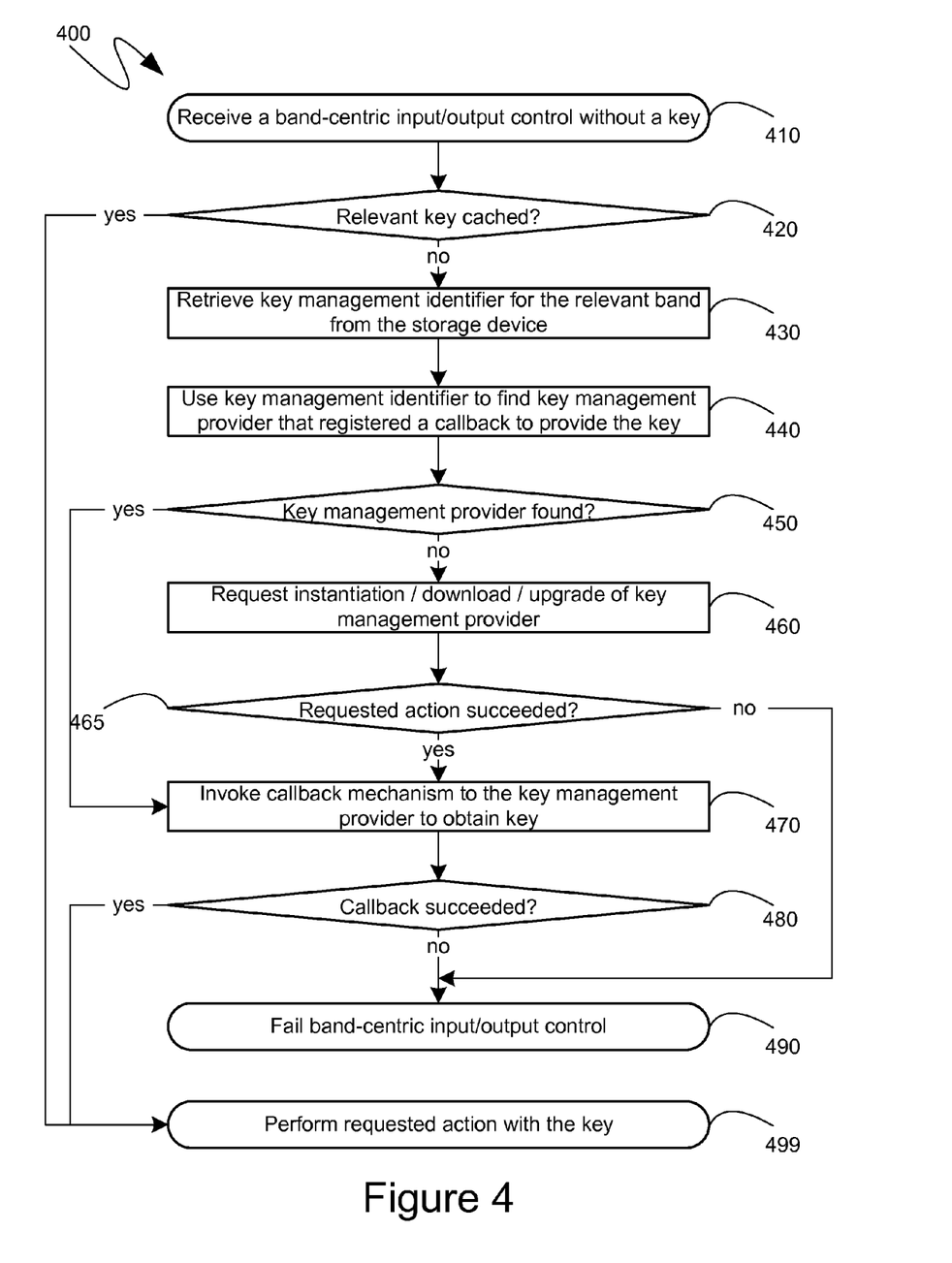
FIG. 4 is a flow diagram of an exemplary operation of an aspect of the dedicated vertically integrated computer-executable instructions.

Turning to FIG. 4, the exemplary flow diagram 400 shown therein illustrates an exemplary series of steps that can be performed by, for example, the universal band management driver 270. Initially, at step 410, a band-centric input/output control can be received that lacks an appropriate cryptographic key to perform the action requested by the control. At step 420, a determination can be made if the relevant key is already cached. If, at step 420, the relevant key is found in the cache, processing can proceed to step 499, at which point the band-centric input/output control can be performed, except this time specifying the required key.

However, if at step 420 the relevant key is not cached, a key management identifier associated with the relevant band can be retrieved from the hardware encrypting storage device at step 430. At step 440, utilizing the key management identifier obtained at step 430, the identified key management provider can be found. In one embodiment, if, at step 450, the key management provider did not register a callback mechanism, an external process can be referenced to request that the key management provider be instantiated, downloaded or upgraded, as required. Thus, as shown in the exemplary flow diagram 400, an instantiation, download, or upgrade of an identified key management provider can be requested at step 460. Subsequently, at step 465, a determination can be made whether the requested action was successfully performed. If it was successfully performed, as determined by step 465, processing can proceed with step 470, as described below. Alternatively, if, at step 465, it is determined that the requested action was not successfully performed, then, processing can proceed to step 490, also described below.

Returning back to step 450, if, at step 450, the key management provider is found, processing can proceed with step 470 at which point a callback mechanism registered by that key management provider can be utilized to obtain the band authentication key relevant to the band-centric input/output control that was received at step 410. If, at step 480, it is determined that the callback succeeded, processing can proceed with step 499, and the band-centric input/output control can be performed, except this time specifying the required key. If, however, at step 480, it is determined that the callback did not succeed, such as if the key management provider determined that the band authentication key should not be provided, then processing can proceed to fail, at step 490, the band-centric input output/control that was received at step 410.

In one embodiment, to ensure that the data stored on a hardware encrypting storage device remains protected when the device is powered off, mechanisms can be implemented to ensure that the relevant bands of the hardware encrypted storage device are locked prior to the device being transitioned to a low power state. On transitions from low power states back to a normal operational state, the hardware encrypting storage device's security state can be restored. Since hardware encrypting storage devices can be used to store information that is continually changing, and may need to be immediately accessible, such as the page file, de-authentication, and subsequent re-authentication may need to be performed within a relatively short time window between when read and write requests have already ceased, or have not yet resumed, but yet the hardware encrypting storage device can still be, or can already be, powered up.

The storage security class driver 260, shown in FIGS. 2 and 3, can facilitate de-authentication and re-authentication on power transitions by intercepting power requests sent from upper level drivers to the storage bus driver 220, also shown in FIGS. 2 and 3, and completed by the storage bus driver to upper level drivers. For example, on a power-down, storage security class driver 260, shown in FIGS. 2 and 3, can receive a device power down request, place it on hold, send an on-demand de-authentication request to the top of each of the security stacks that are built on top of security device objects created by the storage security class driver, such as a security device object 262 shown in FIGS. 2 and 3, wait for completion of all on-demand de-authentication requests and then send the original power down request. Similarly, on a power-up, storage security class driver 260, shown in FIGS. 2 and 3, can receive a device power up request, add a stack location and a completion routine to the power up request, send the modified power up request and, when the completion routine is called, sends an on-demand re-authentication request to the top of each of the security stacks that are built on top of security device objects created by the storage security class driver, such as a security device object 262 shown in FIGS. 2 and 3. When all of the on-demand re-authentication requests are completed, the storage security class driver 260, shown in FIGS. 2 and 3, can complete the original power up request.

When the universal band management driver 270, shown in FIGS. 2 and 3, receives an on-demand de-authentication request, it can obtain the band authentication key from either the key cache or one of the key management provider callbacks described in detail above. For example, the band operation type of the callback can be set to "temporary de-authentication", and then the band locking state can be changed to "permanently locked". Similarly, when the universal band management driver 270, shown in FIGS. 2 and 3, receives an on-demand re-authentication request, it can get the band authentication key from either the key cache or one of the key management provider callbacks, again described in detail above. For example, the band operation type of the callback can be set to "re-authentication", and then the band locking state can be restored to what it was before transitioning to the low power state.

Since multiple components of computer-executable instructions from different vendors may co-exist in a system like that described above, proper synchronization may be required. Synchronization between key managers can be naturally achieved via band authentication keys, which are not shared between key managers. Once one key manager has taken ownership of a band, other key managers may not be able to change that band anymore, unless the owner releases the band key. Synchronization between the volume provisioning layer 240, shown in FIGS. 2 and 3, and key managers can be achieved through separation of the "change band location" and "change band security" calls. More specifically, the universal band management driver 270, shown in FIGS. 2 and 3, can ensure that each band-centric input/output control is performed atomically and that only one band-centric input/output control is executed at any given time for a particular band or set of addresses on the hardware encrypting storage device.

Hardware encrypting storage devices can facilitate implementation of modular key management by providing storage for various metadata, such as the key management identifier, on a per-band basis. To further protect the integrity of such metadata hardware encrypting storage devices can enforce read-only access to it by default and grant read-write access only after the computer-executable instructions executing on the computing device communicationally coupled to the hardware encrypting storage device have authenticated themselves with the hardware encrypting storage device using the authentication key of the respective band. If a hardware encrypting storage device provides a single per-band metadata field, the first few bytes of that field can be allocated to the key management identifier, and the rest of the field is used for additional metadata.

As can be seen from the above descriptions, a modular mechanism to provide extensible management of hardware encrypting storage devices has been provided. In view of the many possible variations of the subject matter described herein, we claim as our invention all such embodiments as may come within the scope of the following claims and equivalents thereto.

I claim:

1. One or more computer-readable storage media comprising computer-executable instructions for processing band-centric input/output control communications, the computer-executable instructions directed to steps comprising:
    creating a security device object representing self-encrypting features of a hardware encrypting storage device;
    detecting band-centric input/output control communications directed to an existing storage device object associated with the hardware encrypting storage device, the detected band-centric input/output control communications lacking a cryptographic key required to perform actions requested by the detected band-centric input/output control communications;
    redirecting the detected band-centric input/output control communications to a first set of computer-executable instructions differing from the existing storage device object to which the detected band-centric input/output control communications were originally directed; and
    providing command communications to the existing storage device object, the command communications instructing the hardware encrypting storage device to perform the actions requested by the detected band-centric input/output control communications, the provided command communications having been generated by the first set of computer-executable instructions in response to the redirecting.

2. The computer-readable storage media of claim 1, wherein the band-centric input/output control communications that are detected are input/output control communications associated with an exiting volume manager and are band-centric because they are directed to one or more volumes on the hardware encrypting storage device that are associated with, and co-located with, one or more bands.

3. The computer-readable storage media of claim 1, comprising further computer-executable instructions directed to discovering security functionality supported by the hardware encrypting storage device, the discovered security functionality comprising self-encryption; and wherein the creating the security device object representing the self-encrypting features of the hardware encrypting storage device is performed in response to the discovering the security functionality supported by the hardware encrypting storage device.

4. The computer-readable storage media of claim 1, comprising further computer-executable instructions directed to creating another security device object representing detected security features of a hardware encrypting storage device independent of the self-encrypting features.

5. The computer-readable storage media of claim 1, wherein the command communications comprise one or more cryptographic keys relevant to one or more bands associated with the band-centric input/output control communications.

6. The computer-readable storage media of claim 1, comprising further computer-executable instructions directed to: detecting a device power down request; suspending the detected device power down request directed to the hardware encrypting storage device; sending an on-demand de-authentication request to the first set of computer-executable instructions; and ending the suspending of the detected device power down request when the on-demand de-authentication request has been completed.

7. The computer-readable storage media of claim 1, comprising further computer-executable instructions directed to: detecting a device power up request directed to the hardware encrypting storage device; modifying the detected device power up request, the modifying comprising adding a completion routine; transmitting the modified device power up request; sending an on-demand re-authentication request to the first sets of computer-executable instructions in response to an invocation of the completion routine; and completing the device power up request that was detected when the on-demand re-authentication request has been completed.

8. One or more computer-readable storage media comprising computer-executable instructions for controlling a hardware encrypting storage device, the computer-executable instructions directed to steps comprising:
    registering a set of supported band-centric input/output controls to be redirected to the computer-executable instructions;
    receiving a redirected band-centric input/output control communication, comprising at least one of the set of supported band-centric input/output controls, the redirected band-centric input/output control communication having originally been directed to a destination different from the computer-executable instructions,
    identifying at least one band of the hardware encrypting storage device affected by the redirected band-centric input/output control communications; and generating, in response to, and in accordance with, the redirected band-centric input/output control communications, one or more control communications comprising at least one cryptographic key relevant to the identified at least one band.

9. The computer-readable storage media of claim 8, comprising further computer-executable instructions directed to caching the at least one cryptographic key; wherein the generating is performed with the cached at least one cryptographic key.

10. The computer-readable storage media of claim 9, wherein the generating is performed with the cached at least one cryptographic key only if the band-centric input/output control communication does not change a security state of the identified at least one band.

11. The computer-readable storage media of claim 8, comprising further computer-executable instructions directed to: obtaining metadata of the identified at least one band; utilizing the obtained metadata to identify at least one key manager; and obtaining the at least one cryptographic key from the at least one key manager.

12. The computer-readable storage media of claim 11, comprising further computer-executable instructions directed to receiving a registration of a callback mechanism from the at least one key manager; wherein the obtaining the at least one cryptographic key from the at least one key manager is performed by invoking the callback mechanism.

13. The computer-readable storage media of claim 11, wherein the generating and the providing are not performed if the at least one key manager does not provide the at least one cryptographic key.

14. The computer-readable storage media of claim 11, comprising further computer-executable instructions directed to obtaining and installing the identified at least one key manager based on the obtained metadata.

15. The computer-readable storage media of claim 11, comprising further computer-executable instructions directed to upgrading the identified at least one key manager based on the obtained metadata.

16. A method of controlling a hardware encrypting storage device, the method comprising the steps of:
creating a security device object representing self-encrypting features of the hardware encrypting storage device;
detecting band-centric input/output control communications directed to an existing storage device object associated with the hardware encrypting storage device, the detected band-centric input/output control communications lacking a cryptographic key required to perform actions requested by the detected band-centric input/output control communications;
redirecting the detected band-centric input/output control communications to a first set of computer-executable instructions differing from the existing storage device object to which the detected band-centric input/output control communications were originally directed; and
providing command communications to the existing storage device object, the command communications instructing the hardware encrypting storage device to perform the actions requested by the detected band-centric input/output control communications, the provided command communications having been generated by the first set of computer-executable instructions in response to the redirecting.

17. The method of claim 16, further comprising the steps of:
registering a set of supported band-centric input/output controls to be redirected to the first set of computer-executable instructions;
wherein the detected and redirected band-centric input/output control communications comprised at least one of the set of supported band-centric input/output controls that were registered to be redirected to the first set of computer-executable instructions.

18. The method of claim 17, further comprising the steps of:
identifying at least one band of the hardware encrypting storage device affected by the redirected band-centric input/output control communications; and
generating, in response to, and in accordance with, the redirected band-centric input/output control communications, one or more control communications comprising at least one cryptographic key relevant to the identified at least one band.

19. The method of claim 18, further comprising the steps of:
obtaining metadata of the identified at least one band;
utilizing the obtained metadata to identify at least one key manager; and
obtaining the at least one cryptographic key from the at least one key manager.

20. The method of claim 18, further comprising the steps of:
caching the at least one cryptographic key;
wherein the generating is performed with the cached at least one cryptographic key.

* * * * *